(12) United States Patent
Wu

(10) Patent No.: US 10,925,045 B2
(45) Date of Patent: Feb. 16, 2021

(54) DEVICE AND METHOD HANDLING TRANSMISSION IN UNLICENSED BAND

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/448,611

(22) Filed: Mar. 3, 2017

(65) Prior Publication Data

US 2017/0257852 A1   Sep. 7, 2017

Related U.S. Application Data

(60) Provisional application No. 62/302,825, filed on Mar. 3, 2016, provisional application No. 62/352,029, filed on Jun. 20, 2016.

(51) Int. Cl.
*H04W 74/08* (2009.01)
*H04W 24/10* (2009.01)
(Continued)

(52) U.S. Cl.
CPC .......... *H04W 72/042* (2013.01); *H04B 7/063* (2013.01); *H04B 7/0632* (2013.01); *H04L 1/1854* (2013.01); *H04L 1/1861* (2013.01); *H04L 1/1887* (2013.01); *H04L 5/0048* (2013.01); *H04L 5/0055* (2013.01); *H04L 5/0064* (2013.01); *H04W 72/0453* (2013.01);
(Continued)

(58) Field of Classification Search
CPC .......... H04W 72/042; H04W 72/0453; H04W 72/085; H04B 7/0632

USPC ....................... 370/329; 455/452.2
See application file for complete search history.

(56) References Cited

U.S. PATENT DOCUMENTS

2010/0118838 A1 * 5/2010 Gandham .......... H04W 74/085
370/336
2010/0146129 A1 * 6/2010 Nakahara .............. H04W 48/12
709/228
(Continued)

FOREIGN PATENT DOCUMENTS

| CN | 104333873 A | 2/2015 |
|---|---|---|
| CN | 105101223 A | 11/2015 |
| CN | 105873229 A | 8/2016 |

OTHER PUBLICATIONS

Search Report dated Jul. 12, 2017 for EP application No. 17158909.6, pp. 1-21.
(Continued)

*Primary Examiner* — Asad M Nawaz
*Assistant Examiner* — Jason A Harley
(74) *Attorney, Agent, or Firm* — Winston Hsu

(57) ABSTRACT

A communication device for handling a transmission comprises a storage unit for storing instructions and a processing circuit coupled to the storage unit. The processing circuit is configured to execute the instructions stored in the storage unit. The instructions comprise performing a first channel access procedure according to a first channel access priority class for a first transmission on a channel of an unlicensed band with a network, wherein the first transmission comprises at least one of a random access (RA) preamble, a hybrid automatic repeat request (HARQ) feedback, a scheduling request (SR), a channel quality indicator (CQI) and a sounding reference signal (SRS).

5 Claims, 7 Drawing Sheets

(51) Int. Cl.
  *H04J 3/06* (2006.01)
  *H04W 56/00* (2009.01)
  *H04W 74/00* (2009.01)
  *H04W 72/04* (2009.01)
  *H04L 1/18* (2006.01)
  *H04L 5/00* (2006.01)
  *H04B 7/06* (2006.01)

(52) U.S. Cl.
  CPC ... *H04W 74/0808* (2013.01); *H04W 74/0833* (2013.01); *H04L 5/001* (2013.01); *H04L 5/0091* (2013.01)

(56) References Cited

U.S. PATENT DOCUMENTS

| | | | | |
|---|---|---|---|---|
| 2012/0051251 | A1* | 3/2012 | Seo | H04L 43/0847 370/252 |
| 2012/0218963 | A1* | 8/2012 | Kim | H04L 1/1861 370/329 |
| 2013/0083661 | A1* | 4/2013 | Gupta | H04W 4/70 370/235 |
| 2014/0098721 | A1* | 4/2014 | Chen | H04W 72/005 370/280 |
| 2014/0347985 | A1* | 11/2014 | Yi | H04W 28/0289 370/230 |
| 2015/0133057 | A1* | 5/2015 | Yavuz | H04W 72/02 455/63.3 |
| 2015/0365931 | A1 | 12/2015 | Ng | |
| 2016/0037540 | A1* | 2/2016 | Johansson | H04L 1/0009 370/329 |
| 2017/0188391 | A1* | 6/2017 | Rajagopal | H04W 74/0816 |
| 2017/0231004 | A1* | 8/2017 | Babaei | H04W 74/0808 |
| 2017/0231011 | A1* | 8/2017 | Park | H04W 74/0841 |
| 2017/0238334 | A1* | 8/2017 | Yang | H04W 74/0808 370/336 |
| 2017/0257852 | A1* | 9/2017 | Wu | H04B 7/063 |

OTHER PUBLICATIONS

LG Electronics, Wilus Inc., "Correction on CWS adjustment in LAA", 3GPP TSG-RAN WG1 Meeting #84, R1-161534, Feb. 15-19, 2016, St Julian's, Malta, XP051079438.
Search Report dated Oct. 19, 2017 for EP application No. 17158909. 6, pp. 1-16.
LG Electronics, WILUS Inc., "Correction on CWS adjustment in LAA", 3GPP TSG-RAN WG1 Meeting #84, R1-161534, Feb. 15-19, 2016, St Julian's, Malta, XP051079438, pp. 1-5.
LG Electronics, "Random access in LAA", 3GPP TSG RAN WG1 meeting #84, R1-160628, Feb. 15-19, 2016, St Julian's, Malta, XP051064265, pp. 1-5.
MediaTek Inc., "Uplink channel access in LAA", 3GPP TSG RAN WG1 Meeting #84, R1-160976, Feb. 15-19, 2016, St Julian's, Malta, XP051079075, pp. 1-11.
Search Report dated Dec. 12, 2017 for EP application No. 17191254. 6, pp. 1-9.
LG Electronics, "LBT schemes in LAA UL", 3GPP TSG RAN WG1 meeting #84, R1-160630, Feb. 15-19, 2016, St Julian's, Malta, XP051064267, pp. 1-10.
Search Report dated Dec. 13, 2017 for EP application No. 17191255. 3, pp. 1-9.
Office action dated Nov. 12, 2018 for EP application No. 17191254. 6, pp. 1-5.
Office action dated Nov. 12, 2018 for EP application No. 17191255. 3, pp. 1-5.
Nokia Networks, Alcatel-Lucent, Alcatel-Lucent Shanghai Bell, "Channel Access for the Support of LAA UL", 3GPP TSG RAN WG1 Meeting #84, R1-160914, Feb. 15-19, 2016, St. Julian's, Malta, pp. 1-7.
Office action dated Aug. 15, 2018 for EP application No. 17158909. 6, pp. 1-5.
Huawei, HiSilicon, "Other issues related to LBT for eLAA", 3GPP TSG RAN WG1 84 Meeting, R1-160741, Feb. 15-19, 2016, St Julian's, Malta, XP051054068, pp. 1-5.
Office action dated Feb. 15, 2019 for EP application No. 17191255. 3, pp. 1-5.
Office action dated May 3, 2019 for EP application No. 17191254.6, pp. 1-5.
Sony Corporation, "UL Channel access mechanism design in eLAA", 3GPP TSG RAN WG1 Meeting #84, R1-160674, Feb. 15-19, 2016, St Julian's, Malta, pp. 1-3.
ZTE, "Initial Thoughts on LAA DL+UL Data Transmission", 3GPP TSG-RAN WG2#93, R2-161358, Feb. 15-19, 2016, St Julian's, Malta, pp. 1-4.
Ericsson, "On Remaining Details of DL LAA LBT Procedures and Parameters", 3GPP TSG RAN WG1 Meeting #83, R1-157257, Nov. 16-20, 2015, Anaheim, USA, pp. 1-6.
Office action dated Apr. 18, 2019 for the China application No. 201710124929.9, filed Mar. 3, 2017, pp. 1-8.

* cited by examiner

| Channel access priority class (p) | $m_p$ | $CW_{min, p}$ | $CW_{max, p}$ | $T_{mcot, p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

FIG. 4

DEVICE AND METHOD HANDLING TRANSMISSION IN UNLICENSED BAND

CROSS REFERENCE TO RELATED APPLICATIONS

This application claims the benefit of U.S. Provisional Application No. 62/302,825 filed on Mar. 3, 2016, and the benefit of U.S. Provisional Application No. 62/352,029 filed on Jun. 20, 2016, which are incorporated herein by reference.

BACKGROUND OF THE INVENTION

1. Field of the Invention

The present invention relates to a device and a method used in a wireless communication system, and more particularly, to a device and a method of handling a transmission in an unlicensed band.

2. Description of the Prior Art

A long-term evolution (LTE) advanced (LTE-A) system, is an evolution of the LTE system. The LTE-A system includes advanced techniques, such as carrier aggregation (CA), LTE transmission over an unlicensed band (or called LTE-unlicensed, LTE-U) which may need a licensed band (i.e., licensed-assisted access) or may not need the licensed band (i.e., LTE is operated alone in the unlicensed band).

According to the LTE-U, an eNB can provide services to a UE via the unlicensed band. However, the UE may not be able to perform a transmission at a time instant in the unlicensed band to the eNB, because resources in the unlicensed band are not available (e.g., the resources are occupied) at the time instant. That is, the operation of the UE in the unlicensed band cannot be performed regularly due to uncertainty of the resources in the unlicensed band. Thus, how to solve the transmission in the unlicensed band is an important problem to be solved.

SUMMARY OF THE INVENTION

The present invention therefore provides a communication device and method for handling a transmission in an unlicensed band to solve the abovementioned problem.

A communication device for handling a transmission comprises a storage unit for storing instructions and a processing circuit coupled to the storage unit. The processing circuit is configured to execute the instructions stored in the storage unit. The instructions comprise performing a first channel access procedure according to a first channel access priority class for a first transmission on a channel of an unlicensed band with a network, wherein the first transmission comprises at least one of a random access (RA) preamble, a hybrid automatic repeat request (HARQ) feedback, a scheduling request (SR), a channel quality indicator (CQI) and a sounding reference signal (SRS).

A network for handling a transmission comprises a storage unit for storing instructions and a processing circuit coupled to the storage unit. The processing circuit is configured to execute the instructions stored in the storage unit. The instructions comprise performing a first channel access procedure on a channel of an unlicensed band not based on any channel access priority class for a first transmission on the channel, wherein the first transmission comprises at least one of a physical downlink (DL) control channel (PDCCH) order or an uplink (UL) grant; and performing a second channel access procedure on the channel based on a channel access priority class for a second transmission on the channel, wherein the second transmission includes a physical DL shared channel (PDSCH) transmission.

A network for handling a transmission comprises a storage unit for storing instructions and a processing circuit coupled to the storage unit. The processing circuit is configured to execute the instructions stored in the storage unit. The instructions comprise performing a channel access procedure according to a channel access priority class for a transmission on a channel of an unlicensed band, wherein the transmission comprises a physical downlink (DL) control channel (PDCCH) order transmission or an uplink (UL) grant transmission.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a table of channel access priority class according to an example of the present invention.

DETAILED DESCRIPTION

Figure 1:
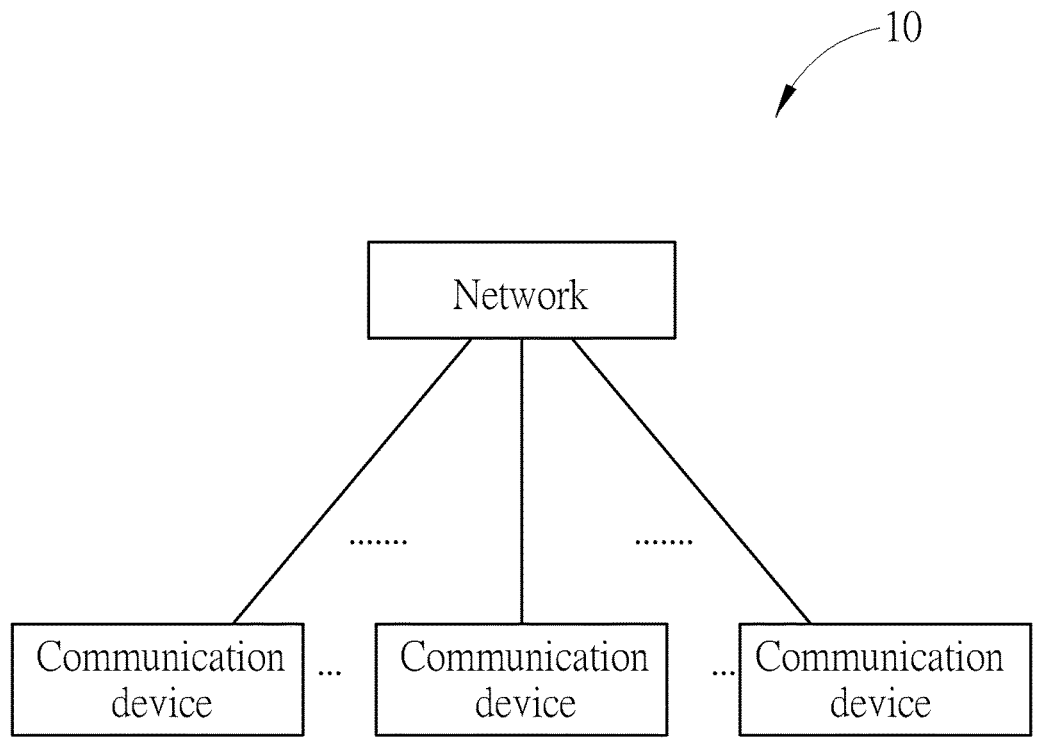
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD). For example, the PCell may be operated on a licensed carrier, while the SCell may be operated on an unlicensed carrier. In addition, the network and the communication devices may support licensed-assisted access.

In FIG. 1, the network and the communication devices are simply utilized for illustrating the structure of the wireless communication system 10. Practically, the network may be a narrowband (NB) internet of things (IoT) network or an evolved universal terrestrial radio access network (E-UTRAN) including at least one evolved Node-B (eNB). The network may be a fifth generation (5G) network including at least one 5G base station (BS) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
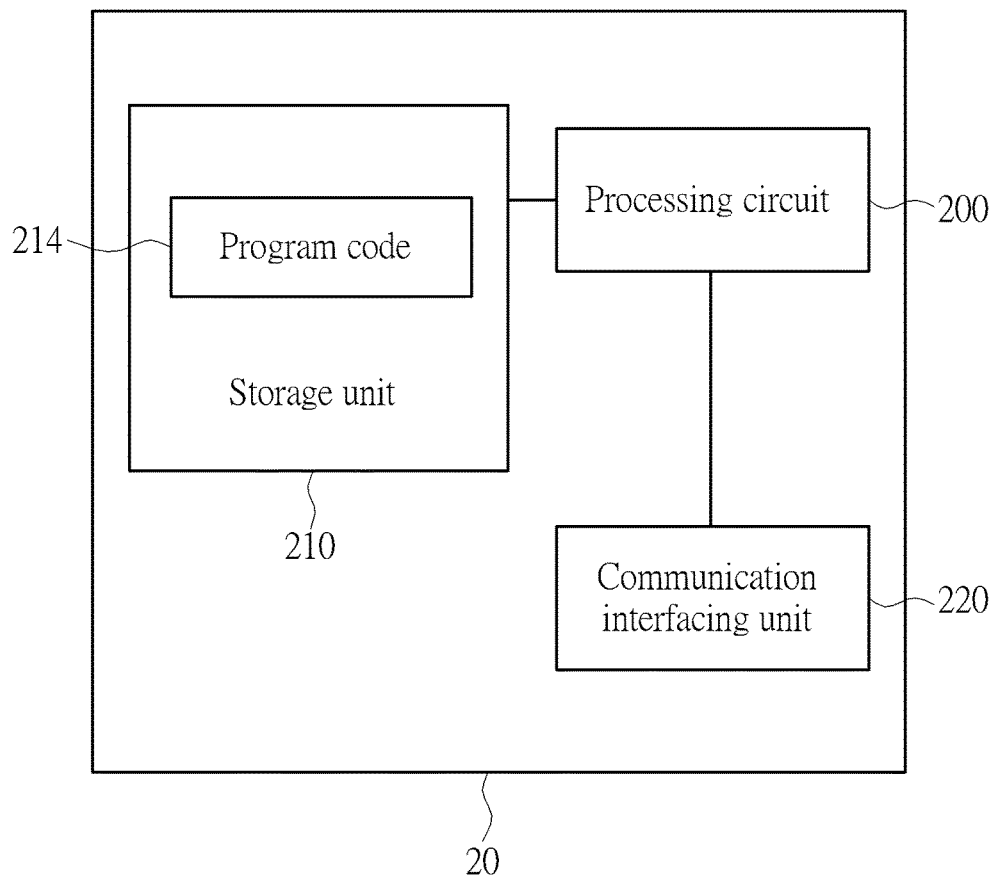
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
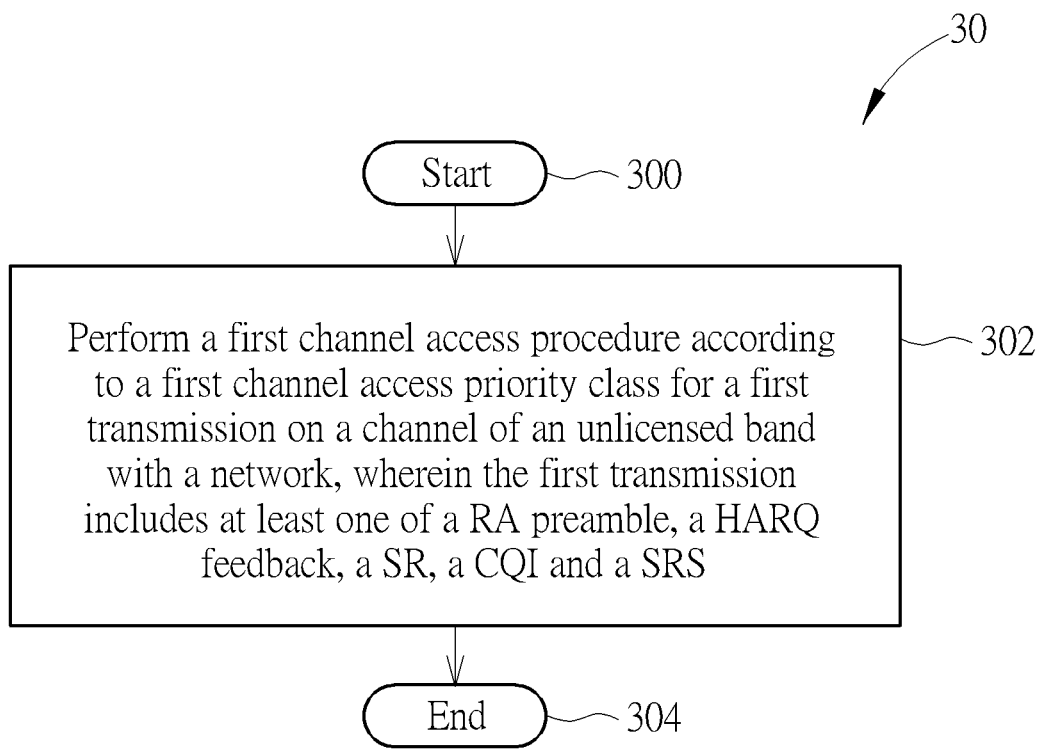
FIG. 3 is a flowchart of a process according to an example of the present invention.

FIG. 3 is a flowchart of a process 30 according to an example of the present invention. The process 30 is utilized in a UE, to handle a transmission in an unlicensed band. The process 30 includes the following steps:

Step 300: Start.

Step 302: Perform a first channel access procedure with the network according to a first channel access priority class for a first transmission on a channel of an unlicensed band, wherein the first transmission includes at least one of a random access (RA) preamble, a hybrid automatic repeat request (HARQ) feedback, a scheduling request (SR), a channel quality indicator (CQI) and a sounding reference signal (SRS).

Step 304: End.

According to the process 30, the UE may perform a first channel access procedure with a network (e.g., BS) according to a first channel access priority class for a first transmission (scheduled or to be performed) on a channel (e.g., carrier frequency) of an unlicensed band. The first transmission may include at least one of a RA preamble, a HARQ feedback, a SR, a CQI and a SRS.

Realization of the process 30 is not limited to the above description. An example of the channel access procedure is described as follows.

The UE performs the first transmission including at least one of a HARQ feedback (e.g., acknowledgement (ACK) or negative acknowledgement (NACK)), a CQI, a SR and a SRS on a channel in an unlicensed band to the network, after sensing that the channel is idle during slot duration (s) of a defer duration $T_d$ and after a counter N is decreased to zero.

The channel may be where licensed-assisted access (LAA)/5G assisted access (5GAA) SCell(s) (i.e., non-standalone operation) or LTE-U/5G-unlicensed (5G-U) Cell(s) (i.e., standalone operation without assistance of a licensed cell) transmission(s) are performed. The counter N may be adjusted by sensing the channel for additional slot duration(s) according to a procedure including the following steps:

(1) set $N=N_{init}$, where $N_{init}$ is a random number uniformly distributed between 0 and $CW_p$, and go to Step (4);

(2) if N>0, set N=N-1;

(3) sense the channel for an additional slot duration, and if the additional slot duration is idle, go to Step (4); else, go to Step (5);

(4) if N=0, stop; else, go to Step (2).

(5) sense the channel during the slot durations of an additional defer duration $T_d$;

(6) if the channel is sensed as being idle during the slot durations of the additional defer duration $T_d$, go to Step (2); else, go to Step (5).

If the UE has not transmitted the first transmission on the channel after Step (4) in the above procedure, the UE may perform the first transmission on the channel, after sensing the channel as being idle at least in the slot durations of an additional defer duration $T_d$. The defer duration $T_d$ may include a duration of $T_f=16$ us immediately followed by $m_p$ consecutive slot durations where each slot duration is $T_{sl}=9$ μs, and $T_f$ may include an idle slot duration $T_{sl}$ at start of $T_f$. The slot duration $T_{sl}$ is considered to be idle, if the UE senses the channel during the slot duration and power detected by the UE for at least 4 μs within the slot duration is less than an energy detection threshold $X_{Thresh}$. Otherwise, the slot duration $T_{sl}$ is considered to be busy.

In one example, the BS transmits a first DL control information (DCI) indicating a physical DL shared channel (PDSCH) transmission to the UE. When the UE receives the first DCI from the BS (e.g., on a physical DL control channel (PDCCH) or an Enhanced PDCCH (EPDCCH)), the UE receives, decodes and/or demodulates the PDSCH transmission according to the first DCI. The UE transmits a HARQ feedback to the BS in response to the PDSCH transmission according to the process 30. The first DCI includes at least one of a random number drew by the BS, a HARQ process number, a modulation and coding scheme (MCS), a new data indicator, a redundancy version, a frequency resource assignment (e.g., resource block assignment).

In an example of Step (1), the UE draws a random number and adjusts the contention window as follows. $CW_{min,p} \leq CW_p \leq CW_{max,p}$ is the contention window. $CW_p$ adjustment is described as follows. $CW_{min,p}$ and $CW_{max,p}$ are chosen during Step (1) of the above procedure. In one example, $m_p$, $CW_{min,p}$, and $CW_{max,p}$ are based on the channel access priority class associated with the first transmission, as shown in a table 40 in FIG. 4. The table 40 includes channel access priority classes with corresponding parameters according to an example of the present invention. The table 40 may be defined in a 3rd Generation Partnership Project (3GPP) specification. The UE does not continuously transmit on a channel on which the transmission(s) are performed, for a period exceeding $T_{mcot,p}$ as given in the Table 40.

In one example, the first channel access priority class is a predetermined channel access priority class configured by the network, or may be specified in a standard specification. The UE uses $m_p$, $CW_{min,p}$, and $CW_{max,p}$ associated with the predetermined channel access priority class (e.g., the channel access priority class 1 in the table 40) in the first channel access procedure for the first transmission. In one example, the first channel access priority class is a new channel access priority class other than the channel access priority classes 1, 2, 3 and 4. In this situation, the at least one of $m_p$, $CW_{min,p}$, $CW_{max,p}$ and $T_{mcot,p}$ associated to the new channel access priority class may be different from $m_p$, $CW_{min,p}$, $CW_{max,p}$ and $T_{mcot,p}$ associated to each of the channel access priority classes 1, 2, 3 and 4. In one example, the BS may indicate the first channel access priority class for the first transmission to the UE in the first DCI indicating the PDSCH transmission or a second DCI requesting the CQI or the SRS, in a system information block (SIB) on a broadcast channel (BCH) in a licensed band or in the unlicensed band, in a Medium Access Control (MAC) control element in the first transmission or in a RRC message (e.g., RRCConnectionReconfiguration message) configuring a LAA/5GAA SCell. In one example, the BS may indicate the second channel access priority class for the PUSCH transmission to the UE in a third DCI indicating the PUSCH transmission to the UE.

In one example, the UE performs a first channel access procedure for the first transmission according to a first priority class while performing a second channel access procedure for a physical UL shared channel (PUSCH) transmission according to a second channel access priority class. If the UE is allowed to transmit the first transmission according to the first channel access procedure (e.g., N=0) while the UE is not allowed to transmit the PUSCH transmission according to the second channel access procedure (e.g., N>0), the UE may transmit the first transmission but may or may not transmit the PUSCH transmission together with the first transmission. If the UE transmits the first transmission together with or not together with the PUSCH transmission on the channel at a same time (e.g., the same subframe), the UE may not decrement a N value (N>0) for the PUSCH transmission during the slot duration(s) overlapping with the first transmission. In one example, if the UE transmits the first transmission together with the PUSCH transmission on the channel at a same time (e.g., the same subframe), the UE may decrement the N value (N>0) for the PUSCH transmission during the slot duration(s) overlapping with the first transmission or may stop the second channel access procedure. If the UE stops the second channel access procedure, the UE will perform a third channel access procedure for a second PUSCH transmission (e.g., a HARQ feedback, a CQI, a SR and/or a SRS) until the UE needs to transmit the second PUSCH transmission.

In one example, the UE performs a first channel access procedure for the first transmission according to a first priority class while performing a second channel access procedure for a PUSCH transmission according to a second channel access priority class. When the UE is allowed to transmit the PUSCH transmission according to the second channel access procedure (e.g., N=0) while the UE is not allowed to transmit the first transmission according to the second channel access procedure (e.g., N>0), the UE transmits the PUSCH transmission but may or may not transmit the first transmission together with the PUSCH transmission. When the UE transmits the PUSCH transmission together with or not together with the first transmission on the channel, the UE may not decrement a N value (N>0) for the PUSCH transmission during the slot duration(s) overlapping with the first transmission. In one example, when the UE transmits the first transmission together with the PUSCH transmission on the channel at a same time (e.g., the same subframe), the UE may stop the first channel access procedure. If the UE stops the first channel access procedure, the UE will perform a third channel access procedure for a second transmission (e.g., a HARQ feedback, a CQI, a SR and/or a SRS), until the UE needs to transmit the second transmission.

In an example of the Step (1), the BS draws the random number, and transmits the random number to the UE in the first DCI indicating the PDSCH transmission, in the second DCI requesting the CQI or the SRS, in a SIB on a BCH in a licensed band or in a LTE-U cell in the unlicensed band, in a MAC control element in the first transmission or in a RRC message (e.g., RRCConnectionReconfiguration) configuring a LAA/5GAA SCell. When the UE receives the random number, the UE performs the channel access procedure by setting a N value to the random number (i.e., Step (1)) and by performing Steps (2)-(6). When the condition N=0 is satisfied, the UE transmits the HARQ feedback, the CQI or the SRS requested by the second DCI.

In addition to the above examples, the first DCI may further include at least one of a frequency resource assignment and a MCS for the UE to transmit the HARQ feedback in the unlicensed band. In one example, the frequency resource assignment for transmitting the HARQ feedback may include a resource block assignment. The UE transmits the HARQ feedback on resource block(s) indicated by the resource block assignment. In one example, the frequency resource assignment for transmitting the HARQ feedback may include a subcarrier assignment. The UE transmits the HARQ feedback on subcarrier(s) indicated by the subcarrier assignment. In one example, the UE transmits the HARQ feedback according to the MCS.

In one example, the UE transmits the HARQ feedback in frequency resources derived from the PDSCH transmission (e.g., starting resource block number) or the first DCI (e.g., control channel element (CCE) number) indicating the PDSCH transmission, if the frequency resource assignment is not provided in the first DCI. The UE transmits the HARQ feedback according to a fixed MCS specified in the standard specification, if the MCS is not provided in the first DCI.

In one example, the BS draws the random number, and transmits the random number to the UE in a SIB on a BCH in a LTE-U/5G-U cell in the unlicensed band or in a LTE/5G cell in the licensed band. The UE sets a N value to the random number (i.e. the Step (1)), and performs the channel access procedure according to the above procedure (e.g., Steps (2)-(6)) to perform a RA procedure to the BS via the LTE-U/5G-U cell or the LAA/5GAA cell. When the condition N=0 is satisfied, the UE transmits a RA preamble via the LTE-U/5G-U cell or the LAA/5GAA cell to perform the RA procedure.

In one example, the BS draws the random number, includes the random number in a RRC message (e.g., RRCConnectionReconfiguration) configuring a LAA/5GAA SCell and transmits the RRC message to the UE via a LTE/5G cell (e.g., PCell or SCell) in a licensed band. When the UE receives the RRC message from the LTE/5G cell, the UE sets a N value to the random number (i.e., Step (1)) and performs the channel access procedure according to the above procedure (e.g., Steps (2)-(6)) to perform a RA procedure in the LAA/5GAA cell. When the condition N=0 is satisfied, the UE transmits a RA preamble to the BS via the LAA/5GAA cell to perform the RA procedure.

In one example, the BS transmits a RRC message (e.g., RRCConnectionReconfiguration) configuring a LAA/5GAA SCell to the UE via a LTE/5G cell (e.g., PCell or SCell) in a licensed band. Then, the UE receives a PDCCH order from the LTE/5G cell or the LAA/5GAA SCell. The PDCCH order triggers the UE to perform a RA procedure, and may include the random number. The UE sets a N value to the random number (i.e., Step (1)), and performs the channel access procedure according to the above procedure (e.g., Steps (2)-(6)) on the channel to perform the RA procedure to the LAA/5GAA cell. When the condition N=0 is satisfied, the UE transmits a RA preamble to the BS via the LAA/5GAA cell to perform the RA procedure.

In one example, the UE receives a PDCCH order which triggers the UE to perform a RA procedure from a LTE-U/5G-U cell. The PDCCH order may include the random number. The UE sets a N value to the random number (i.e., Step (1)), and performs the channel access procedure according to the above procedure (e.g., Steps (2)-(6)) on the channel to perform a RA procedure to the LTE-U/5G-U cell. When the condition N=0 is satisfied, the UE transmits a RA preamble to the BS via the LTE-U/5G-U cell to perform the RA procedure.

In one example, the UE receives a paging message which notifies the UE a mobile terminating call for the UE. The paging message may include the random number. The UE sets a N value to the random number (i.e., Step (1)), and performs the channel access procedure according to the above procedure (e.g. Steps (2)-(6)) on the channel to perform a RA procedure to the LTE-U/5G-U cell. When the condition N=0 is satisfied, the UE transmits a RA preamble to the BS on the channel via the LTE-U/5G-U cell to perform the RA procedure.

In one example, the UE connects to a first LTE/5G-U cell of the BS, and receives a handover command (e.g., RRC-ConnectionReconfiguration) from the first LTE/5G-U cell. The handover command instructs the UE to hand over to a second LTE/5G-U cell. The handover command may the random number. The UE sets a N value to the random number (i.e., Step (1)), and performs the channel access procedure according to the above procedure (e.g., Steps (2)-(6)). In one example, when the condition N=0 is satisfied, the UE transmits a RA preamble to the BS via the second LTE-U/5G-U cell according to the random access configuration to perform the RA procedure. In one example, when the condition N=0 is satisfied, the UE transmits a handover complete message to the second LTE-U/5G-U cell without performing the RA procedure. The handover command may configure the RA preamble or the UE selects the RA preamble from a plurality of RA preambles in the SIB.

In one example, the SIB, the RRC message, the PDCCH order or the paging message may not include the random number, and the UE draws the random number according to the predetermined channel access priority class. The predetermined channel access priority class is either specified in the standard specification or configured in the SIB, the RRC message, the PDCCH order or the paging message.

In one example, for a LAA operation in Japan, if the UE has transmitted the first transmission after N=0 in Step (4) of the above procedure, the UE may transmit the next continuous transmission, for duration of maximum $T_j$=4 ms, immediately after sensing the channel for at least a sensing interval of $T_{js}$=34 μs, if the power detected by the UE during $T_{js}$ is less than $X_{Thresh}$, and if the total sensing and transmission time is not more than $1000T_{mcot}+\lfloor T_{mcot}/T_j \rfloor T_{js}$ μs.

In one example, the $X_{Thresh}$ may be (e.g., directly) configured by the network. In one example, the $X_{Thresh}$ may be derived/adjusted according to a channel bandwidth, a UE power class or parameters configured by the network, or may be specified in a standard specification. In one example, separate $X_{Thresh}$ may be used for the first channel access procedure and the second channel access procedure, respectively. That is, a first $X_{Thresh}$ for the first channel access procedure and a second $X_{Thresh}$ for the second channel access procedure for the PUSCH transmission may be different.

In one example, the UE may adjust the contention window value $CW_p$ as follows. If the UE transmits RA preamble transmission(s) associated with a channel access priority class p on a channel, the UE maintains the contention window value $CW_p$ and adjusts $CW_p$ before Step (1) of the above procedure for the RA preamble transmission(s) by using the following steps:

(7) for the channel access priority class e.g., p∈{0, 1, 2, 3, 4, 5 . . . }, set $CW_p = CW_{min,p}$;

(8) if at least one RA response corresponding to the RA preamble transmission(s) in a reference subframe k is not received (e.g., within a time period), increase $CW_p$ for the channel access priority class to a next higher allowed value and remain in Step (8); otherwise, go to Step (7).

In one example, the reference subframe k is a starting subframe of the most recent RA preamble(s) on the channel made by the UE, for which the at least one RA response is expected to be received.

In one example, the UE determines a first channel access priority class for a first random access preamble transmission and a second channel access priority class for a second random access preamble transmission, wherein the first channel access priority class and the second channel access priority class are different. For example, a priority of the first channel access priority class is higher than a priority of the second channel access priority class. In one example, the UE determines the first channel access priority class for high priority data transmission and the second channel access priority class for low priority data transmission. In one example, the UE determines the first channel access priority class for a signaling message transmission (e.g., non-access stratum (NAS) message or RRC message) and the second channel access priority class for data transmission.

Figure 5:
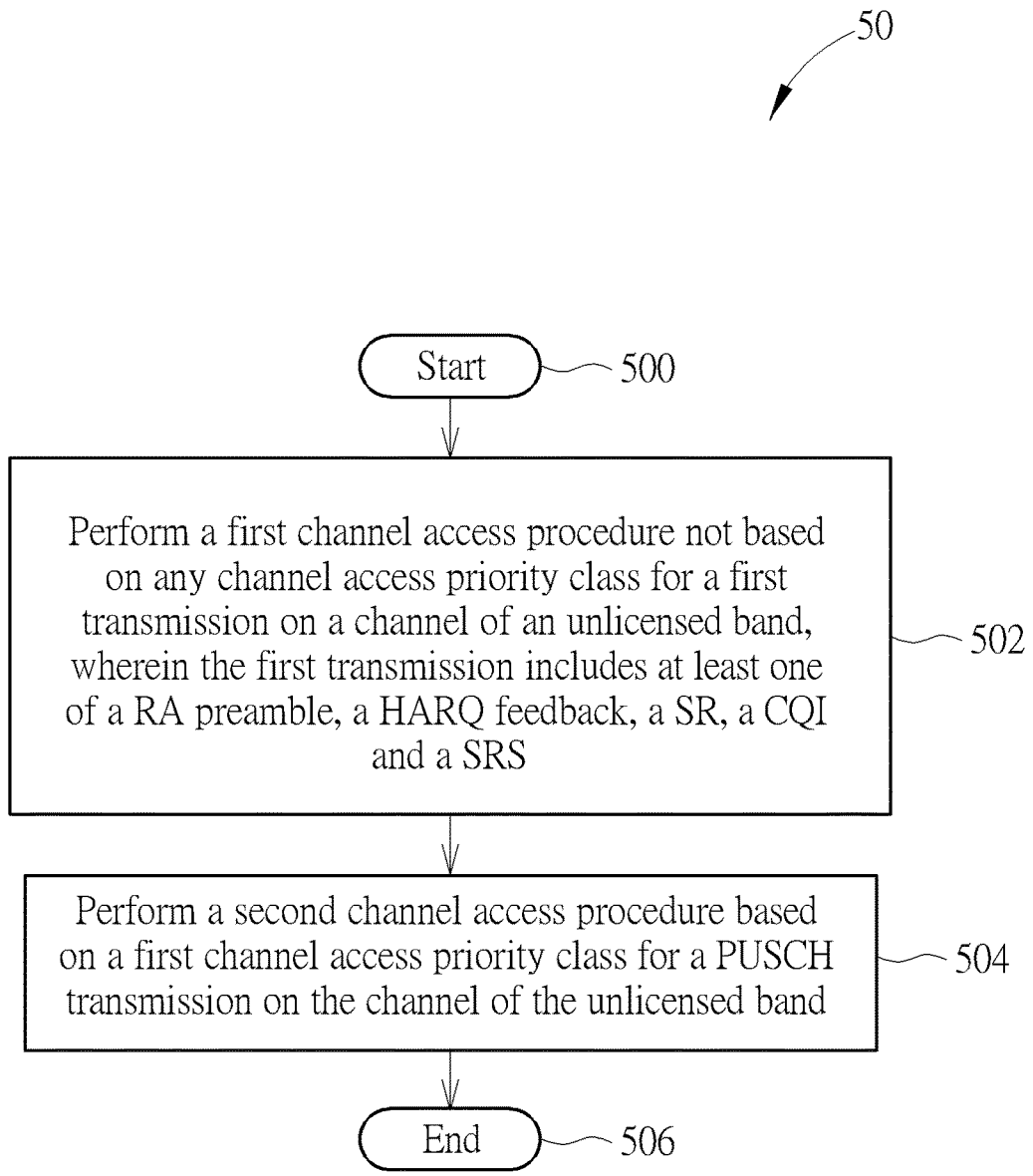
FIG. 5 is a flowchart of a process according to an example of the present invention.

FIG. 5 is a flowchart of a process 50 according to an example of the present invention. The process 50 may be utilized in a UE, to handle a transmission in an unlicensed band. The process 50 includes the following steps:

Step 500: Start.

Step 502: Perform a first channel access procedure with the network not based on any channel access priority class for a first transmission on a channel of an unlicensed band, wherein the first transmission includes at least one of a RA preamble, a HARQ feedback, a SR, a CQI and a SRS.

Step 504: Perform a second channel access procedure with the network based on a first channel access priority class for a PUSCH transmission on the channel of the unlicensed band.

Step 506: End.

According to the process 50, the UE performs a first channel access procedure with the network (e.g., BS) not based on any channel access priority class for a first transmission (e.g., scheduled or to be performed) on a channel (e.g., carrier frequency) of an unlicensed band. The first transmission may include at least one of a RA preamble, a HARQ feedback, a SR, a CQI and a SRS. That is, the UE does not use $m_P$, $CW_{min,p}$, $CW_{max,p}$ and $T_{mcot,p}$ as described above. The UE performs a second channel access procedure with the network based on a first channel access priority class for a PUSCH transmission (e.g., scheduled or to be performed) on the channel in the unlicensed band. That is, the first channel access procedure is different from the second channel access procedure.

In an example of Step 504, the UE draws a random number directly according to the first channel access priority, adjusts the contention window, performs the second channel access procedure according to Steps (1)-(6), and set a N value to the random number as described in the process 30. The UE may receive the first channel access priority from the BS. In an example of Step 504, the BS draws a random number according to the first channel access priority, and transmits the random number to the UE. The UE performs the second channel access procedure according to Steps (1)-(6), and set a N value to the random number as described in the process 30. That is, the UE performs the second channel access procedure implicitly according to the first channel access priority.

Realization of the process 50 is not limited to the above description. Examples of that the UE performs the second channel access procedure according to the channel access priority class can be referred to the examples of the process 30, and not narrated herein.

In one example, the first channel access procedure is that the UE transmits the first transmission not including the PUSCH transmission (i.e., does not transmit the PUSCH) on the channel (e.g., on which LAA/5GAA SCell(s) transmission(s) are performed) to the network immediately, after sensing the channel for at least one sensing interval (e.g., 25 μs) to be idle, if power detected by the UE during the at least one sensing interval is smaller than a first $X_{Thresh}$. The first $X_{Thresh}$ for the first channel access procedure may be same as or different from a second $X_{Thresh}$ for the second channel access procedure. In one example, the first $X_{Thresh}$ for the first channel access procedure may be set higher than the second $X_{Thresh}$ such that the UE has higher probability to transmit the first transmission. Furthermore, if the power is not smaller than the first $X_{Thresh}$, the UE may keep sensing the channel for the at least one sensing interval.

In one example, the UE performs the first channel access procedure for the first transmission not based on any channel access priority class while performing the second channel access procedure for a PUSCH transmission according to a priority class. If the UE is allowed to transmit the first transmission according to the first channel access procedure (e.g., sensing the channel for at least a sensing interval (e.g. 25 μs) and power detected by the UE during the at least one sensing interval is smaller than the first $X_{Thresh}$) while the UE is not allowed to transmit the PUSCH transmission according to the second channel access procedure (i.e., N>0), the UE may transmit the first transmission but may or may not transmit the PUSCH transmission together with the first transmission. If the UE transmits the first transmission together with or not together with the PUSCH transmission on the channel in a time duration (e.g., subframe), the UE may not decrease a N value (N>0) for the PUSCH transmission during the slot duration(s) overlapping with the first transmission. In one example, if the UE transmits the first transmission together with the PUSCH transmission on the channel in a time duration (e.g., subframe), the UE may decrement the N value (N>0) for the PUSCH transmission during the slot duration(s) overlapping with the first transmission or may stop the second channel access procedure. If the UE stops the second channel access procedure, the UE will perform a third channel access procedure for a second PUSCH transmission according to a second channel access priority class until the UE needs to transmit the second PUSCH transmission.

In one example, the UE performs the first channel access procedure for the first transmission not based on any channel access priority class while performing the second channel access procedure for a PUSCH transmission according to a second channel access priority class. When the UE is allowed to transmit the PUSCH transmission to the network according to the second channel access procedure (i.e., N=0) while the UE is not allowed to transmit the first transmission according to the first channel access procedure (i.e., N>0), the UE may or may not be allowed to transmit the first transmission together with the PUSCH transmission. When the UE transmits the PUSCH transmission together with or not together with the first transmission on the channel, the UE may not decrease a N value (N>0) for the PUSCH transmission during the slot duration(s) overlapping with the first transmission. In one example, when the UE transmits the first transmission together with the PUSCH transmission on the channel in a time duration (e.g., subframe), the UE may stop the first channel access procedure. If the UE stops the first channel access procedure, the UE may perform a channel access procedure for a second transmission including at least one of a RA preamble, a HARQ feedback, a CQI, a SR and a SRS, until the UE needs to transmit the second transmission.

In one example, the UE connects to a first LTE-U/5G-U cell of a BS, and receives a handover command (e.g., RRCConnectionReconfiguration) from the first LTE-U/5G-U cell. The handover command instructs the UE to hand over to a second LTE-U/5G-U cell. The UE performs the first channel access procedure not based on any channel access priority class for transmitting a RA preamble on a channel to the second LTE-U/5G-U cell in response to the handover command. When the UE receives a RA response from the second LTE-U/5G-U cell, the UE performs the second channel access procedure. In an example of the second channel access procedure, the UE draws a random number according to a channel access priority class. The channel access priority class may be configured by the handover command, by a RRC message before the UE receives the handover command or by the RA response. In an example of the second channel access procedure, the UE uses a random number in the handover command or in the RA response received from the BS. When the condition N=0 is satisfied, the UE transmits a PUSCH transmission which includes a handover complete (e.g., RRCConnectionReconfigurationComplete) to the second LTE-U/5G-U cell. Thus, the handover in the LTE-U/5G-U is realized.

Realization of the processes 30 and 50 is not limited to the above description.

In the above description, it should be noted that SRS may not be configured by the network for a transmission because the network does not need the UE to transmit the SRS. The PUSCH transmission may include a partial or complete Internet Protocol (IP) packet, a MAC Protocol Data Unit (PDU), a Radio Link Control (RLC) PDU and/or a Packet Data Convergence Protocol (PDCP) PDU. In one example, duration of the first transmission is less than 1 ms. In one example, the first transmission may be transmitted on a PUCCH.

In one example, the UE may not be able to transmit a transmission on a channel in an unlicensed band due to channel busy for a time period which is longer than all of the at least one sensing interval. That is, power detected by the UE is not smaller than $X_{Thresh}$ for the time period in a channel access procedure. In this situation, the UE may drop or abort the transmission and the channel access procedure. That is, the UE does not keep performing the channel access procedure for the transmission, and performs another channel access procedure for another transmission. The time period may be predetermined, determined according to a factor (e.g., subframe(s) scheduled or configured by the network for the transmission), configured by the network or specified in a standard specification. In one example, the time period may be 10 ms or 20 subframes. In one example, the time period may span from the first subframe of a plurality of subframes to the last subframe of the plurality of subframes, if the network schedules the plurality of subframes for the UE to transmit. The transmission may include the first transmission and/or the PUSCH transmission. The UE may start to count the time period, when starting a channel access procedure or when receiving a trigger (e.g., a PDSCH transmission triggering a transmission of a HARQ feedback) for the transmission.

In one example, when the BS receives the RA preamble from the UE, the BS performs Steps (1)-(6) in the above procedure as described in the process 30 before transmitting a first RA response to the UE. The BS draws a random number uniformly distributed between 0 and $CW_p$ according to a known channel access priority class, and sets a N value to the random number. When the condition N=0 is satisfied, the BS transmits the first RA response to the UE. In one example, when the BS receives the RA preamble from the UE, the BS transmits the first RA response on the channel (e.g., on which LAA/5GAA SCell(s) transmission(s) are performed) immediately, after sensing the channel for at least one sensing interval (e.g., 25 μs) to be idle, if power detected by the BS during the at least one sensing interval is smaller than a third $X_{Thresh}$. In one example, the first RA response includes a UL grant and a HARQ process number. Before the UE transmits a transmission on the channel according to the UL grant, the UE performs a third channel access procedure by performing Steps (1)-(6) and set a N value to the random number either configured in the first RA response or drawn by the UE. When the condition N=0 is satisfied, the UE uses a HARQ process identified by the HARQ process number to transmit the transmission on frequency resources indicated by the UL grant.

In one example, when the BS receives the RA preamble via a LAA/5GAA SCell from the UE configured to connect to a licensed cell (e.g., PCell) and the LAA/5GAA SCell, the BS transmits a second RA response to the UE from the licensed cell. In this case, the second RA response does not have the HARQ process number and/or the random number. When the UE receives the second RA response, the UE uses a HARQ process for performing a transmission on the licensed cell according to a UL grant in the second RA response. The HARQ process may be selected or predetermined by the UE from a plurality of HARQ processes in the UE.

Figure 6:
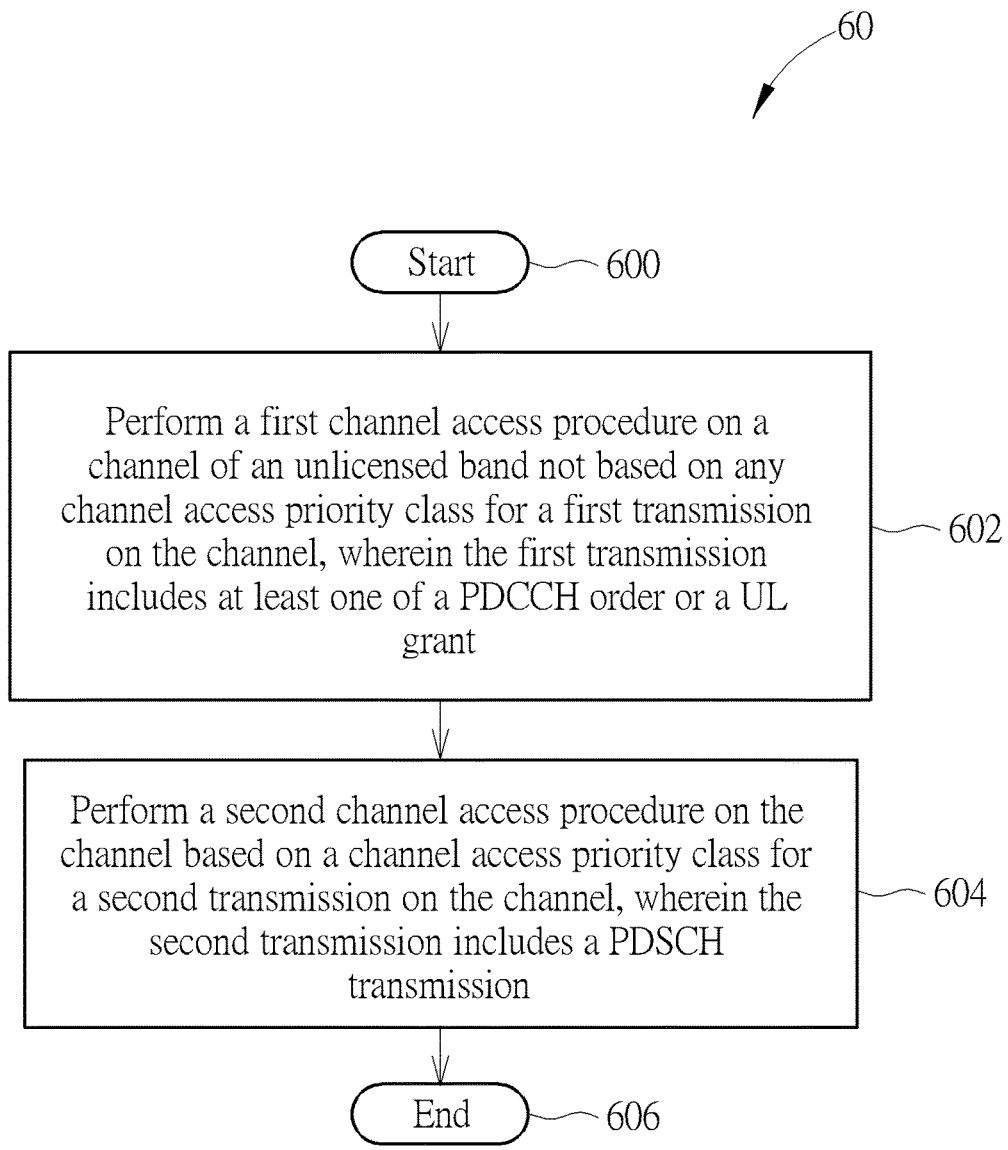
FIG. 6 is a flowchart of a process according to an example of the present invention.

FIG. 6 is a flowchart of a process 60 according to an example of the present invention. The process 60 may be utilized in the network (e.g., a BS), to handle a transmission in an unlicensed band to a UE. The process 60 includes the following steps:

Step 600: Start.

Step 602: Perform a first channel access procedure on a channel of an unlicensed band not based on any channel access priority class for a first transmission on the channel, wherein the first transmission includes at least one of a PDCCH order or a UL grant.

Step 604: Perform a second channel access procedure on the channel based on a channel access priority class for a second transmission on the channel, wherein the second transmission includes a PDSCH transmission.

Step 606: End.

According to the process 60, the network performs a first channel access procedure on a channel of an unlicensed band not based on any channel access priority class for a first transmission on the channel, wherein the first transmission includes at least one of a PDCCH order or a UL grant. The network performs a second channel access procedure on the channel based on a channel access priority class for a second transmission on the channel, wherein the second transmission includes a PDSCH transmission.

When the network determines that the channel is idle according to the first channel access procedure, the network performs the first transmission on the channel to a first UE with the network. When the network determines that the channel is idle according to the second channel access procedure, the network performs the second transmission on the channel to a second UE. The first and second UEs may be the same UE or different UEs.

In an example of Step 602, a BS transmits the PDCCH order or the UL grant on a channel in a LAA/5GAA SCell or a LTE-U/5G-U cell immediately after sensing the channel to be idle for at least a sensing interval $T_{pdcch}$=25 us. $T_{pdcch}$ includes a duration $T_f$=16 us immediately followed by one slot duration $T_{sl}$=9 μs, and $T_f$ includes an idle slot duration $T_{sl}$ at start of $T_f$. The channel is considered to be idle for $T_{pdcch}$, if it is sensed to be idle during the slot durations of $T_{pdcch}$. The above example is for illustrating the first channel access procedure.

In an example of Step 604, a BS transmits a transmission including PDSCH on a channel via the 5GAA/LAA SCell or the 5G-U/LTE-U cell, after sensing the channel to be idle during the slot durations of a defer duration $T_d$; and after the counter N is zero. The counter N is adjusted by sensing the channel for additional slot duration(s) according to the following steps:

(9) set N=$N_{init}$, where $N_{init}$ is a random number uniformly distributed between 0 and $CW_p$, and go to Step (12);

(10) if N>0 and the BS chooses to decrement the counter, set N=–1;

(11) sense the channel for an additional slot duration, and if the additional slot duration is idle, go to Step (12); else, go to Step (13);

(12) if N=0, stop; else, go to Step (10).

(13) sense the channel during the slot durations of an additional defer duration $T_d$;

(14) if the channel is sensed to be idle during the slot durations of the additional defer duration $T_d$, go to Step (10); else, go to Step (13).

If the BS has not transmitted a transmission including a PDSCH on a channel on which 5G/LTE-U cell transmission(s) or 5GAA/LAA SCell(s) transmission(s) are performed after Step (12) in the above procedure, the BS may transmit a transmission including a PDSCH on the channel, after sensing the channel to be idle at least in the slot durations of an additional defer duration $T_d$. The above example is for illustrating the second channel access procedure.

The defer duration $T_d$ includes of duration 16 μs≤$T_f$≤16 μs+$T_s$ immediately followed by $m_p$ consecutive slot durations where each slot duration is 9 μs≤$T_{sl}$≤9 μs+$T_s$, and $T_f$ includes an idle slot duration $T_{sl}$ at start of $T_f$. A slot duration $T_{sl}$ is considered to be idle if the BS senses the channel during the slot duration, and the power detected by the BS for at least 4 us within the slot duration is smaller than energy detection threshold $X_{Thresh}$. Otherwise, the slot duration $T_{sl}$ is considered to be busy. $CW_{min,p}$≤$CW_p$≤$CW_{max,p}$ is the contention window. $CW_{min,p}$ and $CW_{max,p}$ are chosen before Step (9) of the above procedure. $m_p$, $CW_{min,p}$, and $CW_{max,p}$ are based on the channel access priority class associated with the PDSCH transmission. In one example, the channel access priority is one of 1, 2, 3 or 4 shown in the table 40.

If the BS transmits discovery signal transmission(s), PDCCH order transmission(s) or UL grant transmission(s) which don't include a PDSCH when N>0 in the above procedure, the BS does not decrement N during the slot duration (s) overlapping with the discovery signal transmission(s), the PDCCH order transmission(s) or the UL grant transmission(s). The BS does not continuously perform transmissions on the channel, for a period exceeding $T_{mcot,p}$ as given in the table 40. For p=3 and p=4, if the absence of any other technology sharing the carrier can be guaranteed on a long term basis (e.g., by level of regulation), $T_{mcot,p}$=10 ms, otherwise, $T_{mcot,p}$=8 ms.

For 5G-U/LTE-U and/or 5GAA/LAA operation in Japan, if the BS has transmitted a PDCCH transmission after N=0 in Step (12) of the above procedure, the BS may transmit a next continuous transmission, for duration of maximum $T_j$=4 ms, immediately after sensing the channel to be idle for at least a sensing interval of $T_{js}$=34 μs and if the total sensing and transmission time is not more than $1000 \cdot T_{mcot}+|T_{mcot}/T_j-1| \cdot T_{js}$ μs. $T_{js}$ includes a duration $T_f$=16/μs immediately followed by two slot durations $T_{sl}$=9 μs and $T_f$ includes an idle slot duration $T_{sl}$ at start of $T_f$. The channel is considered to be idle for $T_{js}$, if the channel is sensed to be idle during the slot durations of $T_{js}$.

Figure 7:
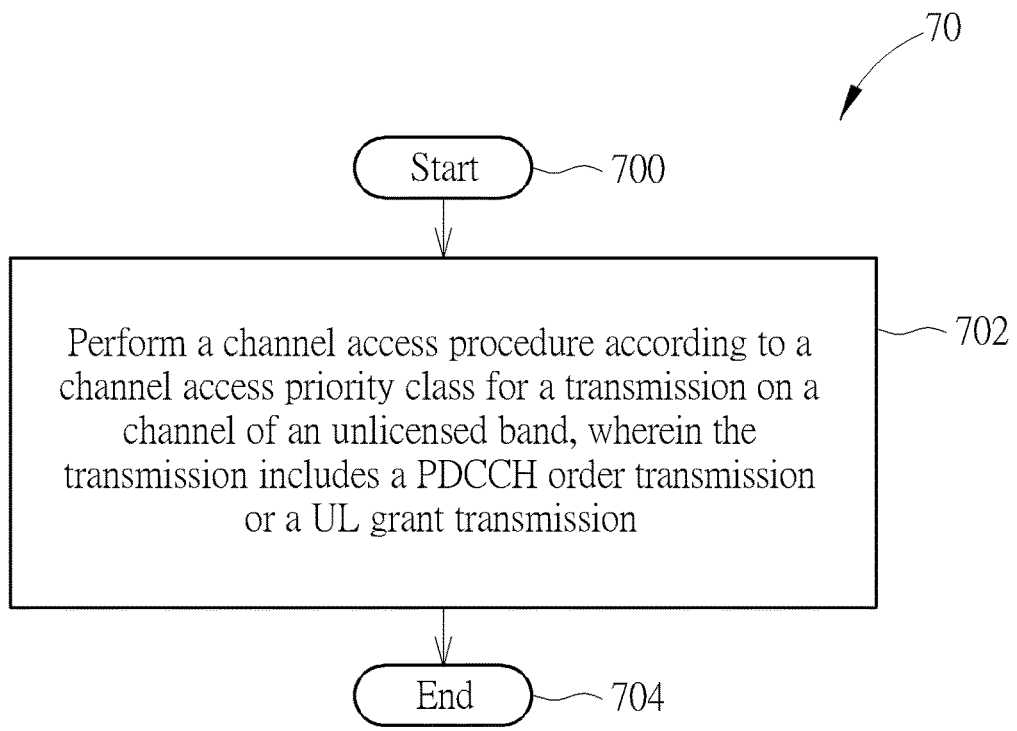
FIG. 7 is a flowchart of a process according to an example of the present invention.

FIG. 7 is a flowchart of a process 70 according to an example of the present invention. The process 70 may be utilized in the network (e.g., a BS), to handle a transmission in an unlicensed band. The process 70 includes the following steps:

Step 700: Start.

Step 702: Perform a channel access procedure according to a channel access priority class for a transmission on a channel of an unlicensed band, wherein the transmission includes a PDCCH order transmission or a UL grant transmission.

Step 704: End.

According to the process 70, the network (e.g., BS) performs a channel access procedure according to a channel access priority class for a transmission (e.g., scheduled or to be performed) on a channel of an unlicensed band. The transmission includes a PDCCH order transmission or a UL grant transmission. When the UE determines the channel is idle according to the channel access procedure, the UE performs the transmission on the channel.

The BS may perform the channel access procedure for transmitting the PDCCH order or UL grant to a UE, using the steps (9)-(14) as described above.

In one example, the BS determines the channel access priority class according to a logical channel (LC) or LC group (LCG) where the UE has data in a buffer. The BS receives a buffer status report from the UE. The buffer status report indicates which LC or LCG (LC/LCG) where the UE has the data in the buffer. For example, the UE is configured with a first LC/LCG and a second LC/LCG. The first LC/LCG is associated with a first channel access priority class, and the second LC/LCG is associated with a second channel access priority class. In one example, in the buffer status report, the UE indicates it has data belonging to the first LC/LCG (e.g., 500 bytes), and does not have data belonging to the second LC/LCG in its buffer for transmission. Then, the BS determines the channel access priority class as the first channel access priority class in the process 70. In one example, in the buffer status report, the UE indicates it has data belonging to the first LC/LCG (e.g., 500 bytes) and data in the buffer belonging to the second LC/LCG (e.g., 300 bytes) in its buffer for transmission. Then, the BS determines the channel access priority class as the second channel access priority class in the process 70, if a LC priority of the second LC/LCG is higher than a LC priority of the first LC/LCG.

In one example, the BS does not adjust the contention window value $CW_p$ for the PDCCH order transmission once the BS determines the $CW_p$. In one example, the BS adjusts the contention window value $CW_p$ as follows. If the BS transmits the PDCCH order transmission(s) associated with a channel access priority class p on a channel, the BS maintains the contention window value $CW_p$ and adjusts $CW_p$ before Step (21) of a channel access procedure for the PDCCH order transmission(s) according to the following steps:

(21) for the channel access priority class, e.g., p∈{0, 1, 2, 3, 4, 5 . . . }, set $CW_p=CW_{min,p}$;

(22) if at least one RA preamble corresponding to the PDCCH order transmission(s) in a reference subframe k is not received (e.g., within a time period), increase $CW_p$ for the channel access priority class to a next higher allowed value and remain in Step (22); otherwise, go to Step (21).

In one example, the BS adjusts the contention window value $CW_p$ as follows. If the BS transmits the PDCCH order transmission(s) associated with a channel access priority class p on a channel, the BS maintains the contention window value $CW_p$ and adjusts $CW_p$ before Step (23) of a channel access procedure for the PDCCH order transmission (s) according to the following steps:

(23) for the channel access priority class, e.g., p∈{0, 1, 2, 3, 4, 5 . . . }, set $CW_p=CW_{min,p}$;

(24) if X % (e.g., X=50, 80 or 100) RA preamble(s) corresponding to the PDCCH order transmission(s) in a reference subframe k is not received, increase $CW_p$ for the channel access priority class to a next higher allowed value and remain in Step (24); otherwise, go to Step (23).

In one example, the reference subframe k is the starting subframe of the most recent PDCCH order transmission(s) on the channel performed by the BS, for which the at least one RA preamble is expected to be received.

In one example, the BS adjusts the contention window value $CW_p$ as follows. If the BS transmits the UL grant transmission(s) associated with a channel access priority class p on a channel, the BS maintains the contention window value $CW_p$ and adjusts $CW_p$ before Step (25) of a channel access procedure for the PDCCH order transmission(s) according to the following steps:

(25) for the channel access priority class, e.g., p∈{0, 1, 2, 3, 4, 5 . . . }, set $CW_p=CW_{min,p}$;

(26) if at least one PUSCH transmission corresponding to the UL grant transmission(s) in a reference subframe j is not received, increase $CW_p$ for the channel access priority class to a next higher allowed value and remain in Step (26); otherwise, go to Step (25).

In one example, the BS adjusts the contention window value $CW_p$ as follows. If the BS transmits the UL grant transmission(s) associated with a channel access priority class p on a channel, the BS maintains the contention window value $CW_p$ and adjusts $CW_p$ before Step (27) of a channel access procedure for the UL grant transmission(s) according to the following steps:

(27) for the channel access priority class, e.g., p∈{0, 1, 2, 3, 4, 5 . . . }, set $CW_p=CW_{min,p}$;

(28) if X % (e.g., X=50, 80 or 100) PUSCH transmission(s) corresponding to the UL grant transmission(s) in a reference subframe j is not received, increase $CW_p$ for the channel access priority class to the next higher allowed value and remain in Step (28); otherwise, go to Step (27).

In one example, the reference subframe j is the starting subframe of the most recent UL grant transmission(s) on the channel made by the BS, for which the at least one RA preamble is expected to be received.

In the above examples, if $CW_p = CW_{max,p}$, a next higher allowed value for adjusting $CW_p$ is $CW_{max,p}$. In one example, if $CW_p = CW_{max,p}$ is consecutively used K times for generation of $N_{init}$, $CW_p$ is reset to $CW_{min,p}$ only for the channel access priority class p for which $CW_p = CW_{max,p}$ is consecutively used K times for the generation of $N_{init}$. In one example, the K is selected by BS from the set of values {1, 2, ..., 8} for the channel access priority class.

In an example of the processes 30, 50 and/or 60, the UL grant may be a DCI transmitted on a PDCCH to (e.g., dynamically or semi-persistently) schedule the UE to transmit a PUSCH transmission. The PDCCH may include an EPDCCH and/or a short PDCCH (sPDCCH). The DCI may or may not include the random number for the UE to set the N value in a channel access procedure for a PUSCH transmission as described above. The DCI may or may not include a channel access priority class for a channel access procedure for a PUSCH transmission. The BS may determine the channel access priority class according to a LC priority of a LC/LCG indicated by the UE for which the UE has data in buffer.

In one example, the PDCCH order is a DCI transmitted on a PDCCH. The PDCCH may or may not include an EPDCCH and a sPDCCH. The DCI may or may not include the random number for the UE to set the N value in a channel access procedure for a RA preamble transmission as described above. The DCI may or may not include a channel access priority class for a channel access procedure for a RA preamble transmission.

Each of the PUSCH transmission and PDSCH transmission described in the processes 30, 50 and/or 60 above may include a MAC PDU. In one example, the MAC PDU may include a MAC control element, an IP packet or a RRC message. The MAC PDU may include a sub-header for the MAC control element.

It should be noted that when the random number transmitted by the BS to the UE, actually the UE may not know that the random number is really drew randomly. That is, the BS may select the random number which may not be "random" in some cases. In addition, the UE may not randomly draw the number in some cases. Therefore, the word "random" in the random number described above should not be a restriction for realizing the present invention. In addition, "random" may be interpreted as "pseudo random".

It should be noted that the channel access priority classes in the table 40 is an example. The contents for each channel access priority class in the table 40 may be changed according to design consideration(s) and/or system requirement(s).

Those skilled in the art should readily make combinations, modifications and/or alterations on the abovementioned description and examples. For example, the skilled person can makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for solving a transmission/reception of a HARQ feedback in an unlicensed band. Thus, the uncertainty of the unlicensed band can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A user equipment (UE) for handling a transmission, comprising:
   a storage device; and
   a processing circuit, coupled to the storage device, wherein the storage device stores instructions, and the processing circuit is configured to execute the instructions of:
   performing a first channel access procedure according to parameters $m_p$, $CW_{min,p}$, and $CW_{max,p}$ associated with a channel access priority class 1 defined in a 3rd Generation Partnership Project (3GPP) specification, for a first transmission on a channel of an unlicensed band with a network, wherein the first transmission comprises at least one of a random access (RA) preamble, a scheduling request (SR), a channel quality indicator (CQI) and a sounding reference signal (SRS);
   performing the first transmission on the channel according to the first channel access procedure; and
   performing the first transmission, after sensing that the channel is idle during a plurality of slot durations of a defer duration and a counter is decreased to zero.

2. The UE of claim 1, wherein the instructions further comprise:
   performing a second channel access procedure for a second transmission based on a second channel access priority class defined in the 3GPP specification while performing the first channel access procedure.

3. The UE of claim 2, wherein the second transmission comprises a physical UL shared channel (PUSCH); and the instructions further comprise:
   receiving a downlink (DL) control information (DCI) indicating the PUSCH transmission from the network.

4. The UE of claim 2, wherein the channel access priority class 1 is higher than the second channel access priority class.

5. The UE of claim 1, wherein the channel access priority class 1 is received from the network in a system information block, a Radio Resource Control (RRC) message, a handover command, a DCI, a Physical Downlink Control Channel (PDCCH) order or in a paging message.

* * * * *